United States Patent [19]

Mosso

[11] 4,292,359

[45] Sep. 29, 1981

[54] PROCESS FOR THE CONTINUOUS PRODUCTION OF A PARTLY FINISHED CLAY PRODUCT

[75] Inventor: Luigi Mosso, Santena, Italy

[73] Assignee: Laria-Laterizi Rivestimenti ed Affini-S.p.A., Santena, Italy

[21] Appl. No.: 110,725

[22] Filed: Jan. 9, 1980

[30] Foreign Application Priority Data

Jan. 24, 1979 [IT] Italy .............................. 67153 A/79

[51] Int. Cl.³ .............................................. A23G 1/20

[52] U.S. Cl. .................................... 428/151; 264/140; 264/154; 264/160; 501/145; 264/75

[58] Field of Search ................. 264/75, 140, 154, 160; 106/71; 428/151

[56] References Cited

U.S. PATENT DOCUMENTS 2,914,807 12/1959 Robbins ............................... 264/75

3,993,722 11/1976 Borcher et al. ....................... 264/75

*Primary Examiner*—Donald E. Czaja

*Assistant Examiner*—James R. Hall

*Attorney, Agent, or Firm*—Sughrue, Mion, Zinn, Macpeak & Seas

[57] ABSTRACT

A process for the continuous production, by extrusion, of a partly finished clay product comprising a pair of parallel strips joined in back-to-back relation by a plurality of longitudinally extending walls in the form of frangible bridges which, when the partly finished clay product has been cut into blanks and fired to harden it, can be broken to separate the blanks into two ceramic tiles. The process comprises the steps of feeding a base material to a first screw extruder having two screw conveyors in series separated by a degassing chamber, and feeding a second, differently colored, material to the degassing chamber, preferably through a second screw extruder. Downstream of the degassing chamber the screw conveyor imparts a rotary mixing motion to the two-colored clays to swirl these and then the mixture is pressed through a die plate of suitable shape, which also cuts the extruded strip to expose a face having a wood grain effect.

7 Claims, 4 Drawing Figures

PROCESS FOR THE CONTINUOUS PRODUCTION OF A PARTLY FINISHED CLAY PRODUCT

Figure 1:
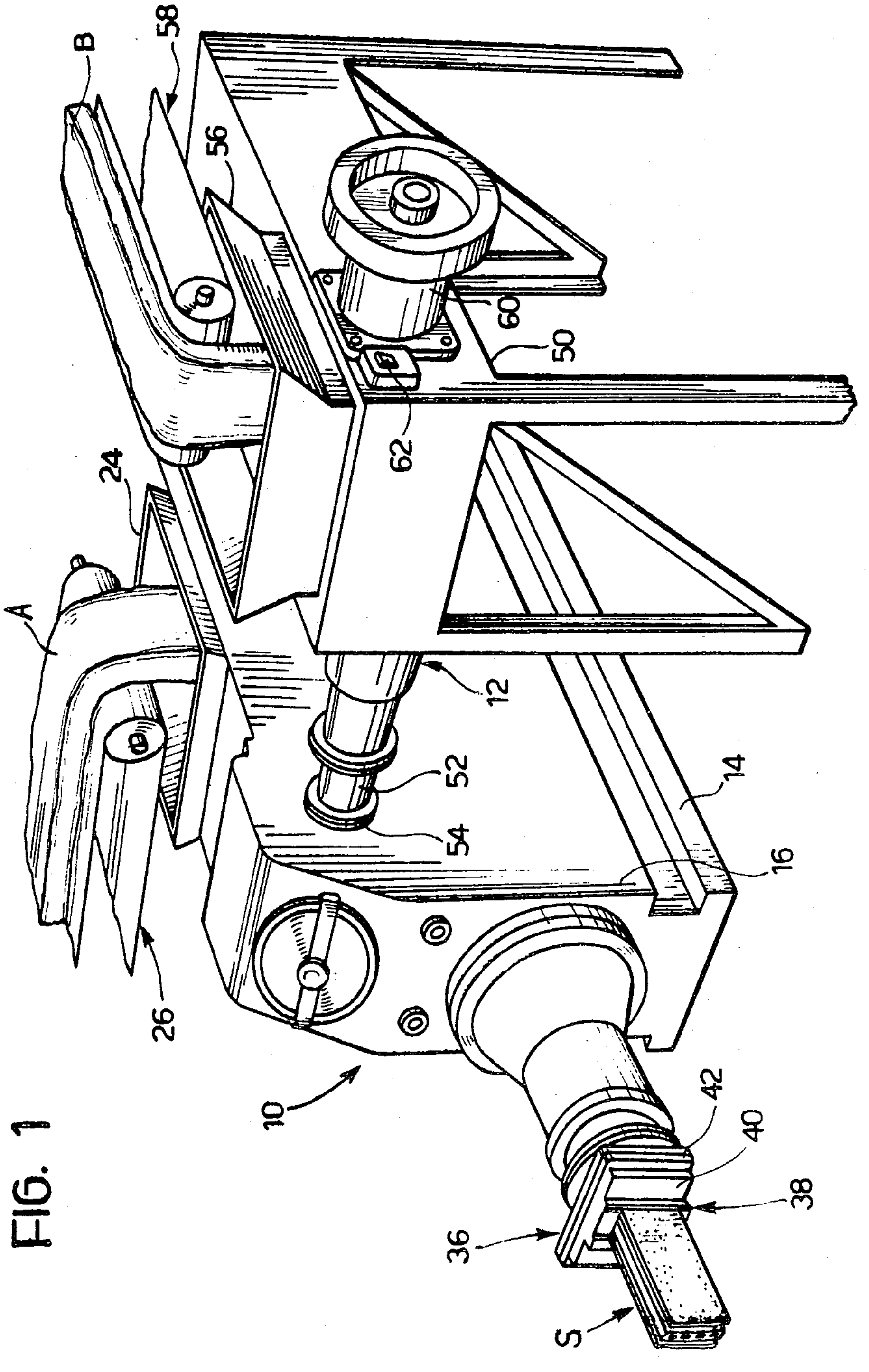

The present invention relates to a process for the continuous production, by means of extrusion, of a partly worked clay product.

In particular, the present invention relates to a process for the production of a partly worked clay product comprising a pair of strips connected together face to face by means of longitudinally extending transverse bridges which can be broken to separate the two strips. Such breaking normally takes place after the strips have been cut transversely into blanks, and hardened by means of firing or kilning; the resultant product being pairs of separate ceramic tiles.

It is known, particularly from processes involving plastics materials, and also from soap manufacturing processes, how to obtain, by means of extrusion, products provided with colored stripes in an approximate imitation of the natural grain of wood. Similar processes have been tried for the production of ceramics from clay materials, particularly for the manufacture of tiles of ceramic clinker, but every attempt to achieve such effects has until now been rather unsatisfactory.

The object of the present invention is therefore to provide a process by means of which a partly worked clay product having an aesthetically satisfactory variegated aspect similar in form and color to the grain of a wood can be obtained.

To this end the present invention resides in a process for the continuous production, by extrusion, of a partly finished clay product in the form of a pair of facing strips joined together by means of longitudinal dividing walls or bridges which, subsequent to the transverse cutting into blanks of the partly finished product, and hardening by means of kilning or firing of the cut blanks, can be broken to obtain pairs of separate tiles of ceramic clinker, characterised by the fact that it comprises the steps of: continuously feeding a first clay material to a first screw extruder having two successive screw conveyors separated by a degassing chamber, feeding a second clay material into the degassing chamber of the first said screw extruder in an imtermittent manner by means of a second screw extruder, the feeding of the second clay material being effected for time intervals which are variable and which are separated by time intervals which are also variable, the screw conveyor downstream of the degassing chamber operating to impart a rotary motion to the mixed material conveyed thereby to an extrusion head of the said first screw extruder, cutting from each strip of the partly worked product, at the output of the extrusion head of the first screw extruder, a longitudinally extending layer having a width equal to the width of the strip and a substantial thickness, whereby to obtain on the surface of each strip coloured stripes resembling wood grain.

By means of this process the partly worked clay product is formed with a grain effect and consequently the tiles of ceramic clinker eventually formed from such partly worked clay product have not only on their surface, but also internally throughout the body of the material, a grain in the form of transverse concentric rings similar to the growth rings of a tree trunk. These rings, which can be seen upon transverse cutting of the partly worked clay product to form tile blanks, contribute effectively to improving the aesthetic effect of the tiles produced at the end of the process.

Preferably the thickness of the material removed by cutting from each strip at the output of the extrusion head of the first screw extruder lies between one fifth and one half of the thickness of the strip.

The process according to the present invention may further comprise the supplementary operation of feeding to the second screw extruder, as recovery material, a part of the material cut away from the extruded strip at the output of the extrusion head of the first screw extruder.

Figure 2:
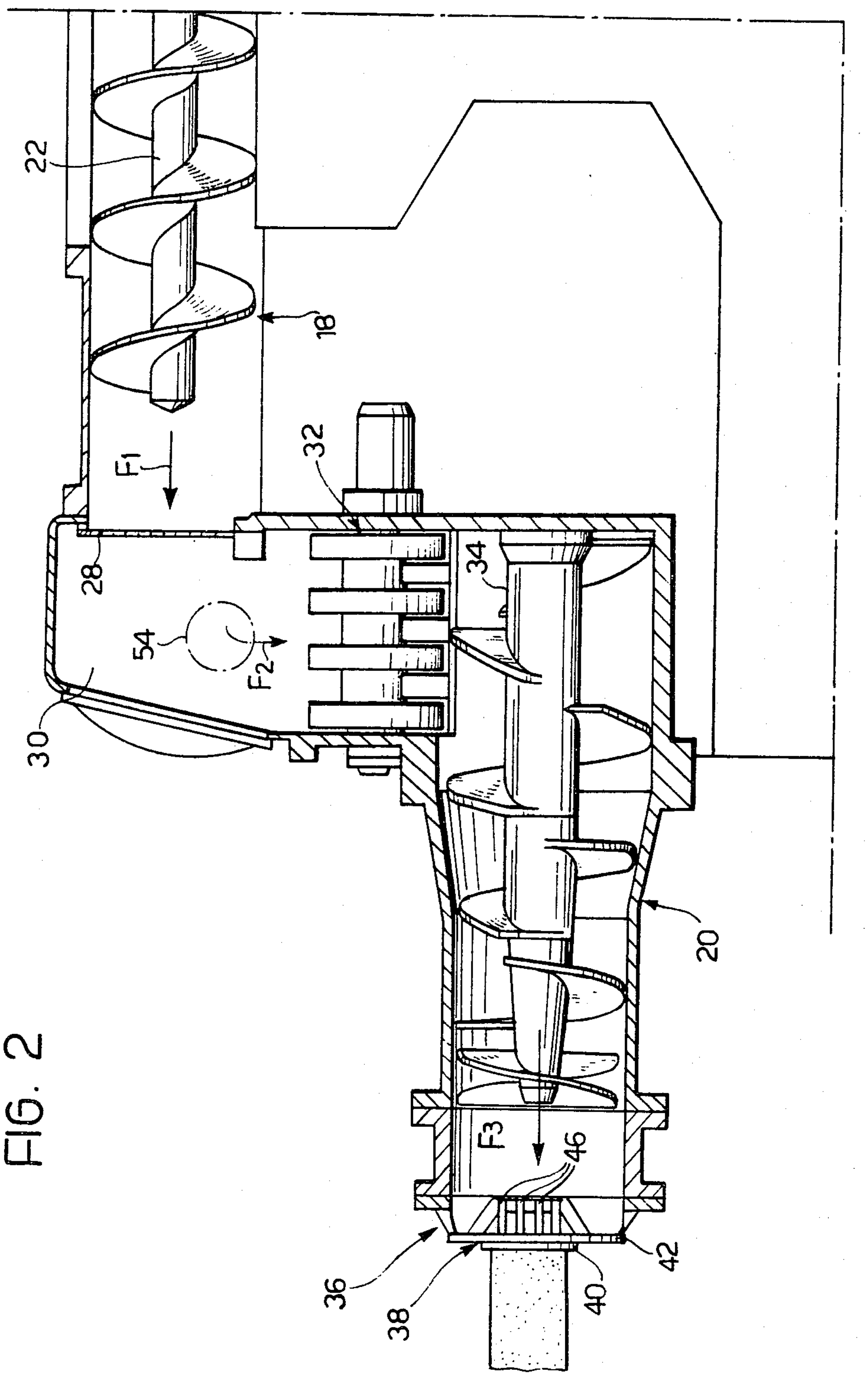
Figure 5:
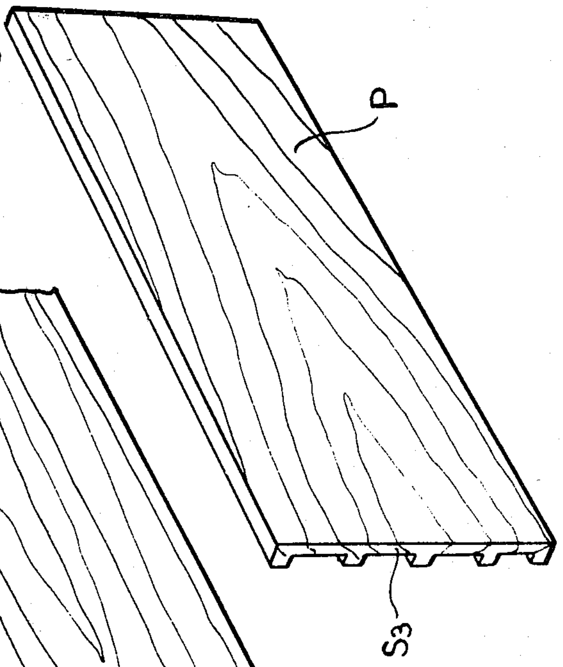
Figure 4:
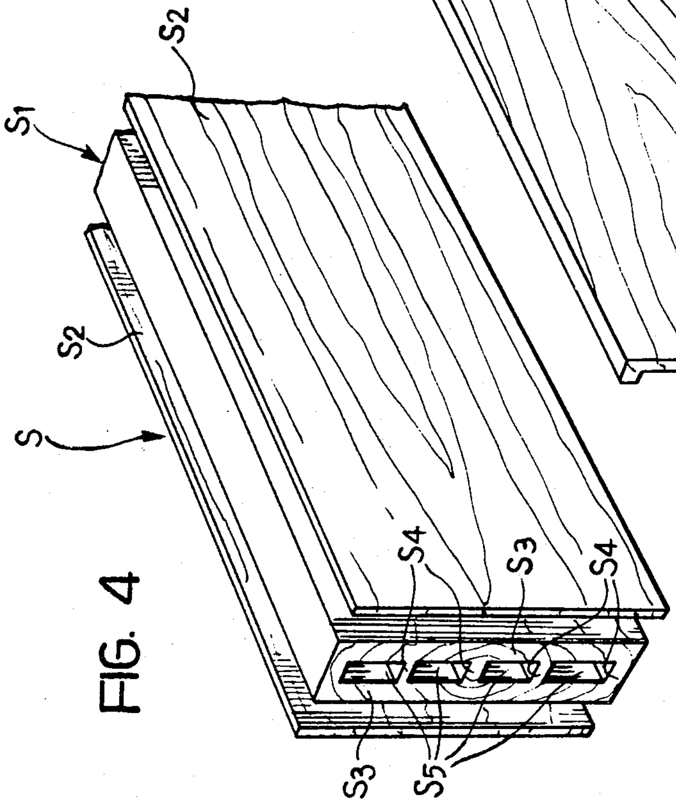
Figure 3:
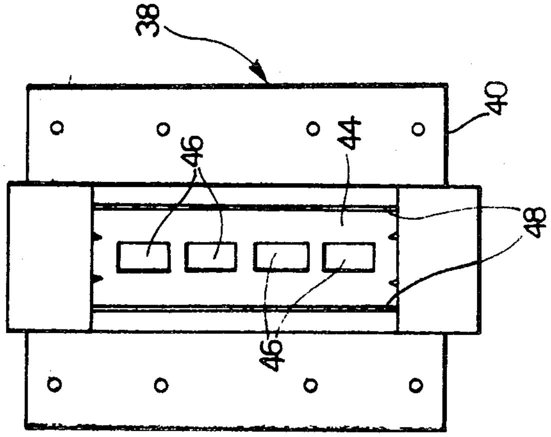

Further characteristics and advantages of the invention will become more clear during the course of the following description in which reference will be made to the accompanying drawings, and which is provided purely by way of non limitative example. In the drawings:

FIG. 1 is a perspective view of apparatus for the performance of the process according to the invention, FIG. 2 is a schematic view in partial longitudinal section of a part of the apparatus illustrated in FIG. 1, FIG. 3 is a front elevation, and on a larger scale, of a detail of the apparatus illustrated in FIGS. 1 and 2, FIG. 4 is a perspective view of a partly worked clay product produced by the process according to the invention, and FIG. 5 is a perspective view of a tile of ceramic clinker formed from the partly worked clay product illustrated in FIG. 4.

Referring first to FIGS. 1 to 3, the apparatus for the performance of the process according to the invention comprises first and second screw extruders respectively indicated with the reference numerals 10 and 12. The screw extruder 10 comprises a base 14 supporting a housing 16 within which are lodged two screw conveyors 18, 20. The screw conveyor 18 is situated at an upper level with respect to the screw conveyor 20, and is provided with a pair of parallel and counter rotating screws only one of which, indicated 22, can be seen in FIG. 2. The screw conveyors are driven in a manner known per se. The screw conveyor 18 can be fed through an aperture formed in the upper part of the casing 16 over which there is mounted a hopper 24. Above the hopper 24 extends the end part of a conveyor belt 26. The screw conveyor 18 communicates through a perforated plate or transverse grill 28 with the interior of a degassing chamber 30.

The degassing chamber 30 is open at the bottom and communicates, via a conveyor device 32, with the initial section of the screw conveyor 20 which comprises a single axially rotatable screw 34. The end part of the screw conveyor 20, which projects out from the casing 16, has an extrusion head 36 provided with a die plate 38.

The die plate 38, illustrated schematically in FIG. 3, comprises a plate 40 removably mounted on a vertical flange 42 of the extrusion head 36 and having an aperture 44 with a rectangular profile the longer sides of which are disposed vertically. In the central part of the aperture 44 there are provided a plurality of axially extending horizontal bars 46 having a rectangular cross section and spaced from one another, suspended from the extrusion head 36 along a line parallel to the longer sides of the aperture 44.

The die plate 38 is, moreover, provided with a pair of vertical knives 48 each of which is supported from the plate 40 within the aperture 44 at a location between the row of bars 46 and a respective one of the longer sides of the aperture 44. The distance between each knife 48 and the corresponding longer side of the aperture 44 lies preferably between a quarter and a tenth of the length of the smaller side of the aperture 44.

The second screw extruder 12 is directed perpendicularly with respect to the screw conveyors 18, 20 of the first screw extruder 10 and is supported at one end by a support framework 50 located alongside the casing 16 of the first extruder 10. The extruder 12 is provided at its exit end with a tubular connection which communicates, through a lateral opening 54 in the casing 16, with the degassing chamber 30. The second extruder 12 can be fed through an aperture formed on the upper part of the support casing 50 over which there is mounted a hopper 56. Over the hopper 56 extends the end part of a linear conveyor belt 58 similar to the conveyor belt 26 which feeds the first screw extruder 10. The second extruder 12 is driven, in a manner known per se, for example by means of an electric motor, and its operation is controlled by means of a friction clutch 60 also of the type known per se; the clutch 60 is manually controlled by means of a control switch 62, or alternatively may be automatically controlled in such a way as intermittently to activate and deactivate the second extruder 12 in a variable and non regular manner.

The operation of the apparatus illustrated in FIGS. 1 to 3 for performing the process according to the invention is as follows.

A first base clay material, indicated A, is fed continuously by means of the conveyor belt 26 into the hopper 24 and from there passes into the interior of the screw conveyor 18 of the first screw extruder 10. Within the screw conveyor 18 the clay material A is urged by the counter rotating screws 22 in the direction of the arrow $F_1$ and pressed against the apertured plate or grill 28. Subsequently the material A passes through this apertured plate or grill 28 and penetrates, in the form of separate strings, into the degassing chamber 30 within which it is subjected, in a known way, to a degassing process. The clay material A falls by gravity onto the conveyor device 32 which feeds it to the second screw conveyor 20.

Contemporaneously, a second clay material B, having a different coloration from the coloration of the base material A, is fed by means of the conveyor belt 58 into the hopper 56 and from there into the second screw extruder 12. The second screw extruder 12, the capacity of which is preferably between a quarter and a tenth of the capacity of the first screw extruder 10, intermittently feeds the second clay material B towards the tubular connector 52 and the aperture 54. Through this aperture 54 the material B penetrates into the interior of the degassing chamber 30, as indicated by the arrow $F_2$. In a manner similar to the base material A, the second material B is degassed and falls by gravity onto the conveyor device 32 which conveys it, together with the base material A, to the screw 34 of the second screw conveyor 20.

The intermittent feeding of the second material B is obtained either by manually operating the control push button 62, or alternatively by an automatic device, in such a way as to engage the friction clutch 60 for variable periods of time and to disengage the friction clutch 60 during intervals of time which are also variable. The intervals of time during which the clutch is engaged preferably lie between 15 and 30 seconds, while the intervals of time for which the clutch is disengaged preferably lie between 30 and 120 seconds. In this way the rotary movement impressed by the single screw 34 of the second screw conveyor 20 on the mixture constituted by the base material A and the second material B causes the second material to swirl into rings substantially concentric with the axis of the screw 34 and having a thickness, intensity and spacing which is variable in dependence on the amount of the second material B let into the degassing chamber 30 in relation to the base material A, which in turn is dependent on the length of the time periods for which the friction clutch 60 has been engaged or disengaged.

The mixture of the base material A and the second material B, as well as being swirled by the screw 34, is also pressed in the direction of the extrusion head 36, as indicated by the arrow $F_3$. The mixture is thus extruded through the die plate 38 in the form of a partly finished continuous clay product S, which is carried away from the output of the draw plate 38 by a conveyor belt (not shown).

The partly finished clay product S, illustrated in detail in FIG. 4, is constituted by a central portion S1 and by two lateral portions S2. The central portion S1 is constituted by two vertical facing strips S3 connected together by means of longitudinally extending bridges or dividing walls S4 separated by square apertures S5 caused, upon extrusion, by the bars 46 of the die plate 38. The lateral portions S2 of the partly finished product S are constituted by two longitudinal layers cut from the strip S3 by means of the knives 48 of the die plate 38. Each longitudinal layer S2 has a height equal to the height of the central portion S1 and a thickness lying preferably between a half and a fifth of the thickness of the corresponding strip S3.

The central portion S1 of the partly finished product S is forwarded to subsequent working stations, known per se and not illustrated in the drawings, in which it is cut transversely into blanks and hardened by means of kilning or firing. The fired blanks are subsequently forwarded to a finishing station in which the longitudinal dividing bridges S4 are broken, in a known way, whereby to obtain pairs of separate tiles of ceramic clinker.

In FIG. 5 there is shown one such tile, indicated P, which can be made starting from the partly finished product S formed by the process according to the invention. This tile P has on its surface colored stripes which imitate the grain of a piece of wood. Throughout its thickness the tile P has a plurality of transverse substantially concentric rings, similar to the rings of a piece of wood, which are visible at the transverse end faces.

As far as the lateral portions S2 of the partly worked product are concerned, these are removed immediately downstream of the extrusion head 36 and may be reutilised in other production lines for the fabrication of ceramic products. A part of the lateral portions S2 is fed as recovery material, by means of the conveyor 58, to the hopper 56 of the second screw extruder 12 in such a way as to constitute in part (or totally with the addition of further colorant) the second material B. The proportion of the recovery material withdrawn from the lateral portions S2 for feeding back to the extruder 12 is preferably between 10% and 20% of the lateral portions S2.

What is claimed is:

1. A process for producing partly finished clay tiles in the form of a pair of facing strips joined together by longitudinally extending frangible bridges comprising:

(a) feeding continuously a first clay to a first screw extruder having first and second screw conveyors in series with one another and a degasing chamber disposed intermediate said first and second screw conveyors, (b) feeding intermittently a second clay having a different color into said degasing chamber by means of a second screw extruder for variable time intervals which are separated by variable non-feeding time intervals, (c) imparting a rotory motion to the mixture of said first and second clays by means of said second screw conveyer to swirl said mixture, (d) extruding the swirled mixture through an extrusion head on said first extruder to form a pair of continuous strips joined together by longitudinally extending bridges, and (e) cutting from each continuous strip at the output of said extrusion head a longitudinally extending layer having a width equal to the width of said strip and a substantial thickness to provide colored stripes on the surface of the remaining portion of each strip resembling a natural wood grain.

2. The process of claim 1 wherein the thickness of the layer cut from each strip at the output of said extrusion head is between one-fifth and one-half of the thickness of each strip.

3. The process of claim 1 wherein at least a portion of said second clay fed to said second screw extruder is comprised of a portion of the layers cut from said strips at the output of said extrusion head.

4. The process of claim 1 wherein the portion of said layers which is fed to said second screw extruder is between 10% and 20% of the total material of said layers.

5. The process of claim 1 wherein the capacity of said second screw extruder is between one-fourth and one-tenth of the capacity of said first screw extruder.

6. The process of claim 1 further comprising cutting said partly finished clay tiles into blanks, hardening said blanks by firing and breaking said bridges to obtain separate tiles of ceramic clinker.

7. A tile of ceramic clinker having colored stripes resembling a natural wood grain made by the process defined in claim 6.

* * * * *